2,526,340

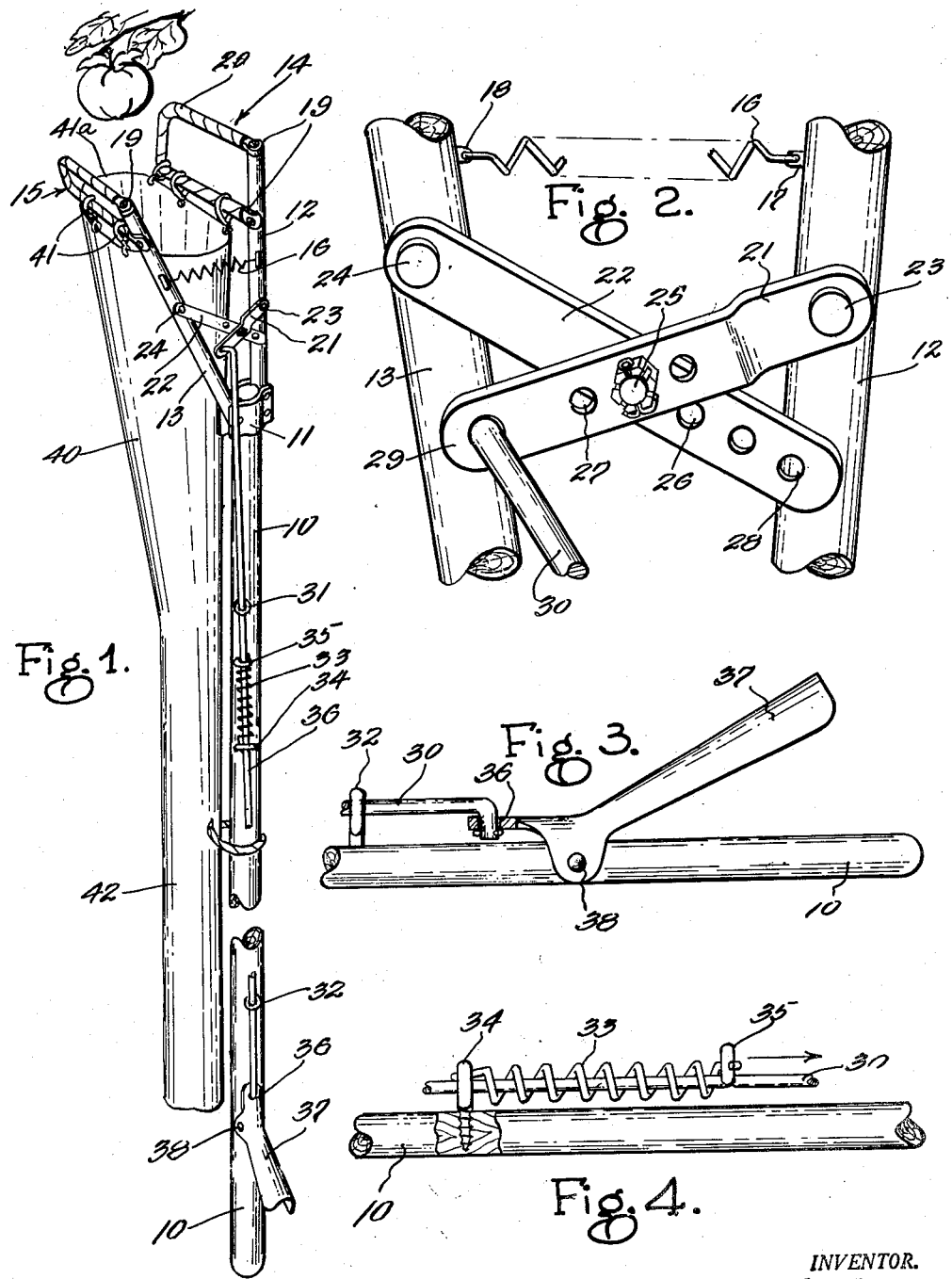
Oct. 17, 1950 — H. A. FELSING — 2,526,340
FRUIT PICKER
Filed May 1, 1946
INVENTOR.
HERMAN A. FELSING
BY Wilfred E. Lawson
Attorney Patented Oct. 17, 1950

UNITED STATES PATENT OFFICE 2,526,340

FRUIT PICKER

Herman A. Felsing, Middletown, N. Y.

Application May 1, 1946, Serial No. 666,409

2 Claims. (Cl. 56—334)

My invention relates to a very simple implement for picking fruit from trees without injuring the fruit in any manner, as by crushing or scratching the skin. This fruit picker is best suited for gathering large fruit such as apples or any citrus fruit and depositing it in a basket or other receptacle.

It is easy to handle and can be manufactured at low cost.

With these and other objects in view the invention will be readily understood from the following description with the aid of the accompanying drawing which forms part of this application.

In the drawing—

Figure 1 is a mutilated assembled view in perspective of my fruit gatherer;

Figure 2 is a fractional view in side elevation and larger scale;

Figure 3 is a view in side elevation of the operating handle;

Figure 4 is a similar view of a portion of the carrying staff with spring attachment.

Like numerals in the different views relate to the same details.

One embodiment of my invention is illustrated in the accompanying drawing.

Reference numeral 10 represents a long pole or staff preferably made of light wood or bamboo, but a light metal tube may just as well be employed. This staff is of sufficient length to reach high up in a fruit tree, when raised by an operator, in order to pick the fruit.

At the upper end of the staff which is cut off flat, is secured a metal clip 11 which serves as a support for a pair of oppositely disposed arms 12 and 13, one on each side of the staff 10; the arm 12 being fixedly secured at its lower end to said collar and rising vertically therefrom and the arm 13 pivoted at its lower end to the collar for swinging movements relatively to the arm 12. The top end of each arm 12, 13 is provided with a jaw 14, 15, of substantially rectangular loop form, which extend from the arms parallel to each other. The jaws 14, 15 are normally held apart by a compression spring 16 having its ends engaged with eyes 17, 18 secured in the arms 12 and 13, respectively. In this manner the hands or jaws stand normally separated sufficiently for an apple or other fruit on a tree to enter between them.

Each jaw 14, 15 is made of a heavy metal wire, bent into the rectangular loop form, as before stated, and has its forward corners flattened and secured by bolts or rivets 19 to the upper end portions of said arms 12, 13. To preserve the skin of the fruit from being marred or crushed, the jaws are preferably encased with a protective material, such as friction or rubber tape 20, or for a like purpose cloth may be stretched over and about each jaw if so desired.

Cross connected between the two arms 12 and 13 is provided by flat metal links 21, 22 pivoted respectively at 23, 24 and hinged together by a pivot bolt 25. Extra pivot holes 26, 27 are provided in both links for the purpose of adjusting the gripping gap between the jaws 14, 15, in accordance with the size of the fruit to be gathered.

Beyond the pivot 25 each link has an extension with an aperture 28, 29 for receiving selectively the hooked end of an operating rod 30 which is carried to slide up or down along the staff 10 in staples 31, 32. A lifting spring 33 is provided, held at its lower end fixed to the staff 10 by a screw eye 34 and at its other end fixed at 35 to the operating rod 30. The lower end of the operating rod 30 is hooked into an eye 36 of a handle lever 37 which points away from the staff 10, to which it is pivoted to swing on a pin 38, when pressed against the side of the staff 10. It will be evident that the upward expansion of the compression spring 33 will cause the operating rod to act on the handle 37 to hold it away from the staff 10. As a consequence, the jaws 14, 15 will extend apart for taking hold of a suspended apple or other fruit until the handle 37 is pressed by the operator and the jaws 14, 15 close on the fruit which will then become detached from the tree branch and held between the picker jaws 14, 15 until again opened when the handle 37 is released.

Between the two lower side portions of the jaws 14, 15 is suspended a downwardly tapering bag 40 of canvas or netting. It has a wide mouth 41 open upwardly, when the gap is formed between the jaws 14, 15. The bag 40 is suspended from the two jaws to which its edge is attached by twine or wire at 41. The narrow end of the bag has a downward tubular extension 42 open at the bottom and long enough to reach to the ground and is preferably held firm against the staff by looped twine or wire 42a.

In using this fruit picker the operator raises the staff 10 to reach in between the tree branches in position to grasp an apple or other fruit with the picker jaws 14, 15. He then closes the jaws by pressing the operating handle 37 against the staff 10, when the hands 14, 15 will close over the fruit and the same be detached from the tree branch by a jerk or quick pull on the staff. As a consequence, the fruit enters the bag 40 and is guided by its tubular extension 42 into a receptacle placed on the ground or a basket held by the operator.

From the foregoing description it is thought to be obvious that a fruit picker constructed in accordance with my invention is particularly well adapted for use by reason of the convenience and facility with which it may be assembled and operated.

I claim:

1. In a fruit picker, a staff, a collar mounted on the top end of said staff, an arm fixedly secured in vertical position at its lower end to one side of said collar, a second arm pivoted at its lower end to the opposite side of said collar, a jaw of substantially rectangular loop form offset from the upper end portion of each of said arms, a pair of crossed links pivoted at one of their ends to said arms, a pivot connection between said links at their points of crossing, an actuating element pivotally connected at one end to the free end of one of said links and depending therefrom along side of said staff, and means mounted adjacent the lower end of said staff for manipulating said actuating element to swing said second arm toward and away from said fixed arm to cause said jaws to detach a fruit from its supporting twig or branch, and an open ended bag dependingly supported from the lower sides of said jaws.

2. The invention as defined in claim 1, with the said actuating element in the form of a rod, guides spaced along said staff for said rod, and the said means for manipulating said rod has the form of a lever pivoted to the staff and to the lower end of the rod.

HERMAN A. FELSING.

REFERENCES CITED

The following references are of record in the file of this patent:

UNITED STATES PATENTS

| Number | Name | Date |
|---|---|---|
| 435,206 | Cain | Aug. 26, 1890 |
| 459,467 | Herring | Sept. 15, 1891 |
| 1,056,221 | Schumann | Mar. 18, 1913 |
| 1,178,889 | Volland | Apr. 11, 1916 |
| 1,304,127 | Vucinovich | May 20, 1919 |
| 1,744,614 | Crank | Jan. 21, 1930 |

FOREIGN PATENTS

| Number | Country | Date |
|---|---|---|
| 207,048 | Switzerland | Sept. 30, 1939 |